US009327812B2

(12) United States Patent
Kim

(10) Patent No.: US 9,327,812 B2
(45) Date of Patent: May 3, 2016

(54) SILENCER DUCT FOR SHIP'S PROPELLER USING RESONANT BARRELS

(71) Applicant: MOKPO NATIONAL MARTIME UNIVERSITY INDUSTRY—UNIVERSITY COOPERATION FOUNDATION, Mokpo-si, Jeollanam-do (KR)

(72) Inventor: Sang Hoon Kim, Gwangju (KR)

(73) Assignee: MOKPO NATIONAL MARITIME UNIVERSITY INDUSTRY-UNIVERSITY COOPERATION FOUNDATION, Mokpo-Si (KR)

(*) Notice: Subject to any disclaimer, the term of this patent is extended or adjusted under 35 U.S.C. 154(b) by 0 days.

(21) Appl. No.: 14/398,412

(22) PCT Filed: Jun. 5, 2013

(86) PCT No.: PCT/KR2013/004947
§ 371 (c)(1),
(2) Date: Oct. 31, 2014

(87) PCT Pub. No.: WO2013/191397
PCT Pub. Date: Dec. 27, 2013

(65) Prior Publication Data

US 2015/0122576 A1 May 7, 2015

(30) Foreign Application Priority Data

Jun. 18, 2012 (KR) ........................ 10-2012-0064880

(51) Int. Cl.
*F16K 47/02* (2006.01)
*B63H 5/14* (2006.01)

(Continued)

(52) U.S. Cl.
CPC .. *B63H 5/14* (2013.01); *F04D 3/00* (2013.01); *F04D 29/669* (2013.01); *G10K 11/172* (2013.01)

(58) Field of Classification Search
CPC ..................................................... F16L 55/033
USPC ................................. 181/233, 224, 227, 228
See application file for complete search history.

(56) References Cited

U.S. PATENT DOCUMENTS 2,718,274 A * 9/1955 Kimbal ......................... 181/264
4,821,841 A 4/1989 Woodward et al.

(Continued)

FOREIGN PATENT DOCUMENTS

CN 201705428 U 1/2011
EP 1701028 A2 * 9/2006

(Continued)

OTHER PUBLICATIONS

CN Office Action dated Jan. 25, 2016 as received in Application No. 201380022700.4 (English Translation).

*Primary Examiner* — Forrest M Phillips
(74) *Attorney, Agent, or Firm* — Maschoff Brennan

(57) ABSTRACT

The present invention relates to a silencer duct for a ship's propeller using resonant barrels, wherein the ship's propeller is surrounded by the silencer duct so as to deaden underwater noises of various frequencies generated by the propeller, the duct being made into a cylindrical form to surround the propeller arranged in the side or rear part of the ship so as to guide the fluid direction as the propeller rotates, and the inside of the duct being provided with a plurality of resonant barrels for damping resonant frequencies arranged in the form of n×m (herein, n and m are natural numbers except 0) so as to damp the sound waves generated by the rotation of the propeller.

7 Claims, 3 Drawing Sheets

(51) Int. Cl.

*F04D 3/00* (2006.01)
*F04D 29/66* (2006.01)
*G10K 11/172* (2006.01)

(56) References Cited

U.S. PATENT DOCUMENTS

| | | | | |
|---|---|---|---|---|
| 5,444,196 | A * | 8/1995 | Woods | 181/227 |
| 6,116,375 | A * | 9/2000 | Lorch et al. | 181/224 |
| 6,270,385 | B1 * | 8/2001 | Varney et al. | 440/38 |
| 7,905,322 | B2 * | 3/2011 | Woods et al. | 181/264 |
| 8,162,101 | B2 * | 4/2012 | Ono | 181/229 |
| 8,459,407 | B2 * | 6/2013 | Jangili | 181/224 |
| 2002/0040825 | A1 * | 4/2002 | Dausch | 181/224 |

FOREIGN PATENT DOCUMENTS

| | | | |
|---|---|---|---|
| JP | 10-001043 | A | 1/1998 |
| JP | 10-039875 | A | 2/1998 |
| JP | 2006-335463 | A | 12/2006 |

* cited by examiner

SILENCER DUCT FOR SHIP'S PROPELLER USING RESONANT BARRELS

TECHNICAL FIELD

The present invention relates to a silencer duct for a ship's propeller and, more particularly, to a silencer duct for a ship's propeller using resonant barrels structured such that a ship's propeller is surrounded by a silencer duct using resonant barrels so as to deaden underwater noise of various frequencies generated by the propeller.

BACKGROUND ART

In general, a propulsion system of a ship includes a drive shaft connected to an engine and protruding from a tail of the hull, and a propeller mounted to an end portion of the drive shaft to generate drive force by rotation. As the propeller rotates in the fluid, a pressure difference occurs between the fluid-inflow side and the fluid-outflow side, and accordingly lift force is generated at each blade. Such lift force generated at the propeller acts as drive force of the ship.

According to the above-described propulsion mechanism of the ship, underwater noise is generated from the engine and the propeller of the ship. Because underwater noise has transmission power and transmission speed several times higher than atmospheric noise, an influence exerted on the marine ecosystem is large. As such, because underwater noise generated from ships has a negative influence on the marine ecosystem in the sea route and aquaculture industry, efforts for reducing underwater noise are needed.

Recently-built ships have soundproofing equipment for reducing engine noise generated inside the ship, however, there is no particular countermeasure against propeller noise generated outside the ship. Especially, propeller noise is primarily generated by high-speed ships or submarines. Further, because international measures to control underwater noise are taken, methods for reducing propeller noise are urgently needed.

DISCLOSURE

Technical Problem

An object of the present invention devised to solve the problem lies in a silencer duct for a ship's propeller using resonant barrels structured such that a ship's propeller is surrounded by a silencer duct using resonant barrels so as to deaden underwater noise of various frequencies generated by the propeller.

Technical Solution

The object of the present invention can be achieved by providing a silencer duct for a ship's propeller using resonant barrels, wherein the silencer duct is formed in a cylindrical shape to surround a propeller mounted to a side portion or a tail of a ship, thereby guiding a fluid direction as the propeller rotates, and includes a plurality of resonant barrels for damping resonant frequencies, the resonant barrels being formed on an inner surface of the silencer duct and arranged in the form of n×m (herein, n and m are non-zero natural numbers) so as to damp sound waves generated by rotation of the propeller.

The resonant barrels arranged in the form of n×m may be arranged on the inner surface of the silencer duct in a cylindrical shape such that entrances thereof are directed toward a center of the silencer duct, and a hub of the propeller may be positioned at the center of the cylindrical silencer duct, so that the resonant barrels are arranged to surround pre-swirl stators of the propeller in a cylindrical shape.

The resonant barrels may be formed such that an entrance area of each of the resonant barrels is set to be the same as or different from that of other resonant barrels according to sound frequencies to be deadened, thereby damping sound waves of the same or different resonant frequencies.

The resonant barrels may be formed such that not only the entrance area but also an inner volume or an entrance length of each of the resonant barrels is set to be the same as or different from that of other resonant barrels according to sound frequencies to be deadened, thereby damping sound waves of the same or different resonant frequencies.

The resonant barrels may be individually made of plastic, rubber or metal, and may be adhered to a planar panel made of rubber and rolled into a cylindrical shape. Alternatively, the resonant barrels may be made by injection molding from flexible plastic, rubber or metal to be formed integrally in a planar shape, and may be rolled into a cylindrical shape.

The propeller may be positioned at an inner front portion of the cylindrical silencer duct, an inner middle portion of the cylindrical silencer duct, or between the inner front portion and the inner middle portion of the cylindrical silencer duct.

Advantageous Effects

Since the silencer duct for a ship's propeller using resonant barrels of the present invention having the above-described various technical characteristics is structured such that the propeller is surrounded by the silencer duct using the resonant barrels, underwater noise of various frequencies generated by the propeller can be damped and pressure duct effect can also be obtained.

Further, because the frequency band of underwater noise is different according to a size or kind of a ship, the silencer duct can be more easily and selectively embodied according to a kind or size of a ship.

Reduction in underwater noise generated by a propeller of a ship can protect the marine ecosystem, and also can decrease the possibility of being detected in a military aspect.

BEST MODE

Hereinafter, a silencer duct for a ship's propeller using resonant barrels according to an embodiment of the present invention will be described in detail with reference to the annexed drawings.

Figure 1:
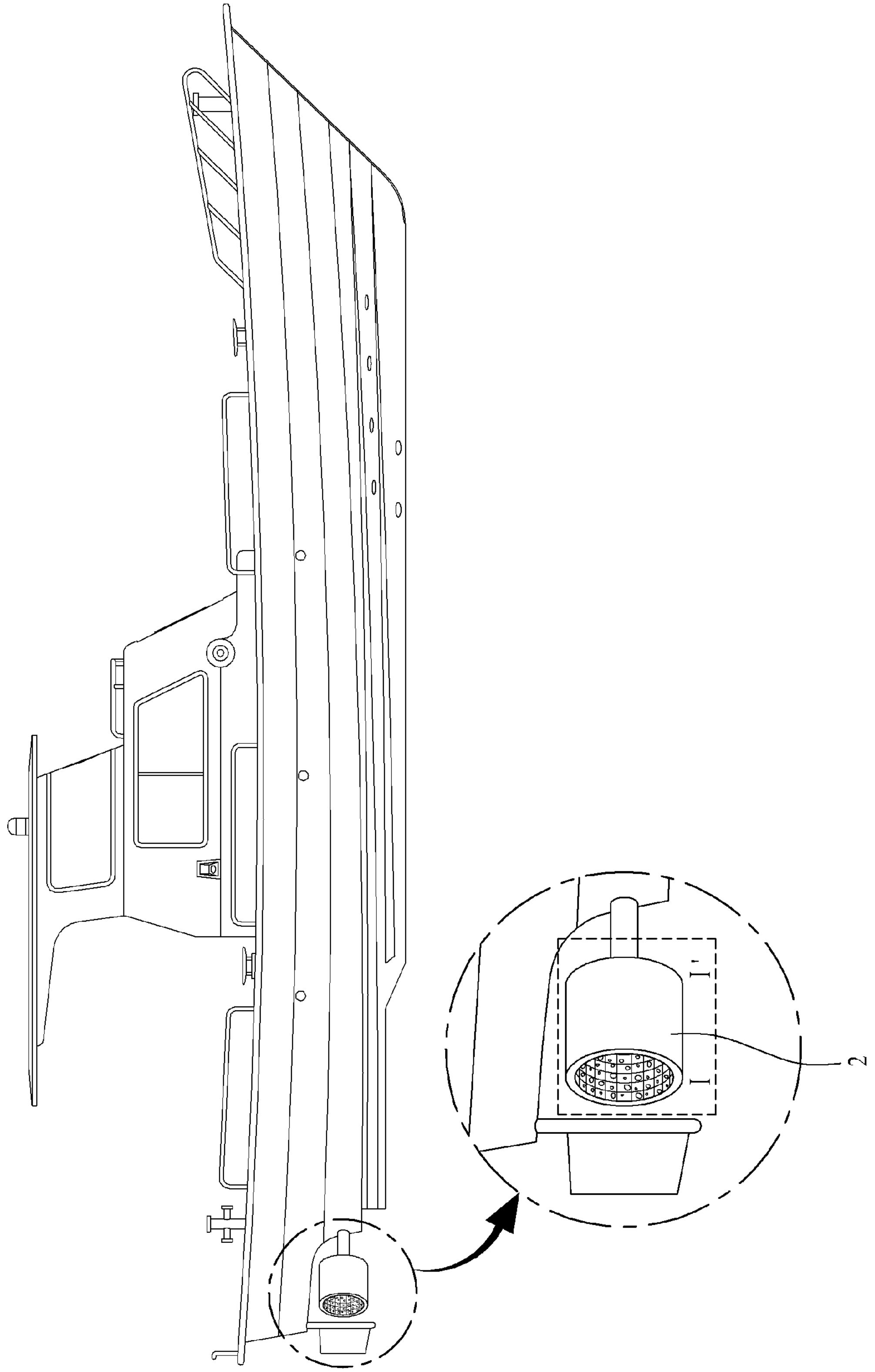
FIG. 1 is a view illustrating a mounting state of a silencer duct for a ship's propeller according to an embodiment of the present invention.
Figure 2:
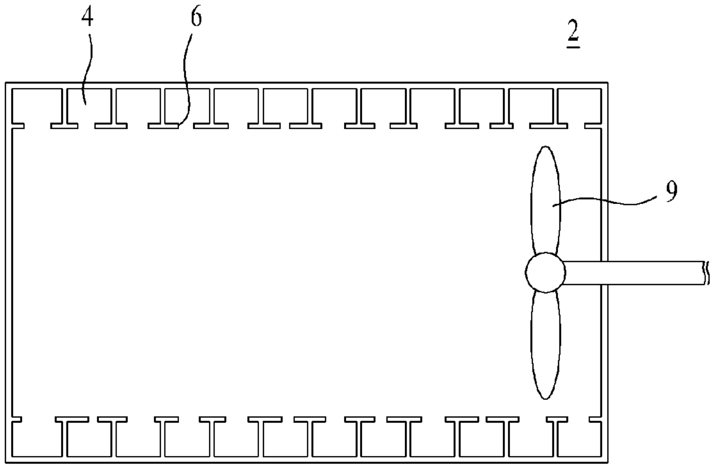
FIG. 2 is a sectional view taken along line I-I' in a longitudinal direction of the silencer duct depicted in FIG. 1.

FIG. 1 is a view illustrating a mounting state of a silencer duct for a ship's propeller according to an embodiment of the present invention. FIG. 2 is a sectional view taken along line I-I' in a longitudinal direction of the silencer duct depicted in FIG. 1, and FIG. 3 is a sectional view taken in a width direction, i.e., a diameter direction of the silencer duct depicted in FIG. 1.

Figure 3:
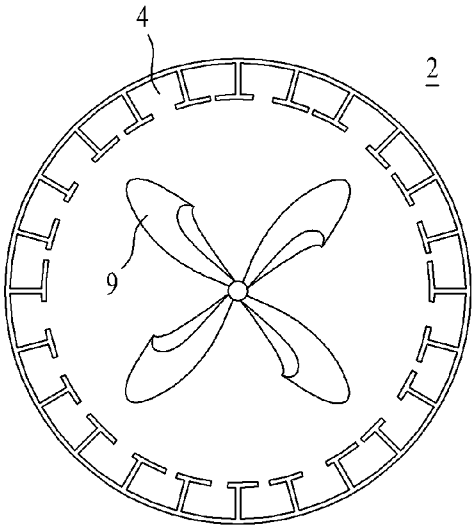
FIG. 3 is a sectional view taken in a width direction, i.e., a diameter direction of the silencer duct depicted in FIG. 1.

As shown in FIGS. 1 to 3, a propulsion body, i.e., a propeller 9, for driving a ship is mounted to a side portion or a tail of the hull.

The propeller 9 can be rotated by a driving shaft configured to transmit driving force of an engine, and includes a plurality of pre-swirl stators extending radially outwardly from a hub. Fluid flows in an axial direction of the propeller 9, and lift force generated by the propeller 9 acts as driving force of the ship.

A silencer duct 2 for a ship's propeller is formed in a cylindrical shape so as to surround outer peripheries of the pre-swirl stators of the propeller 9 mounted to a side portion or a tail of the hull, thereby guiding a fluid direction as the propeller 9 rotates. Such a cylindrical silencer duct 2 has a plurality of resonant barrels 4 for damping resonant frequencies, which are formed on an inner surface of the silencer duct 2 and arranged in the form of n×m (herein, n and m are non-zero natural numbers) so as to damp the sound waves generated by rotation of the propeller 9.

The resonant barrels 4 arranged in the form of n×m on the inner surface of the cylindrical silencer duct 2 are arranged such that entrances thereof are directed toward a center of the cylindrical silencer duct 2. The hub of the propeller 9 is positioned at the center of the cylindrical silencer duct 2, and accordingly the resonant barrels 4 are arranged in a cylindrical shape to surround the pre-swirl stators of the propeller 9.

The cylindrical silencer duct 2 is secured to an outer wall surface of the ship so that the propeller 9 is positioned inside the cylinder and, especially, the propeller 9 is positioned at an inner front portion of the cylinder. This serves to cause the sound waves generated by the propeller 9 to pass through the cylindrical silencer duct 2 as long as possible, that is, to pass through a space defined by the plurality of resonant barrels 4 securely arranged in a cylindrical shape as long as possible, thereby maximally damping the sound waves generated by the propeller 9.

In more detail, when sound waves pass by the resonant barrels 4, sound waves having a frequency corresponding to a resonant frequency cannot pass. This is because, if the resonant barrels 4 are arranged in a row on a sound wave path, sound wavelength transmission falls sharply while passing by the resonant barrels 4. As such, when sound waves of various frequencies pass through a duct in which the plurality of resonant barrels 4 are arranged in a row, a sound wave having a specific frequency is damped, and this specific frequency is called a resonant frequency. At this time, if the resonant barrel-duct through which sound waves of various frequencies pass has a narrow passage, sound wave damping effect can be obtained although the resonant barrels 4 are arranged in a few rows. However, in the case in which the sound wave passage is large enough to surround the large propeller 4 used for a ship, as shown in FIG. 3, the resonant barrels 4 should be arranged in a plurality of rows in a cylindrical shape. Accordingly, if the resonant barrels 4 causing resonance corresponding to the frequency of the sound wave generated by the propeller 4 are arranged in a cylindrical shape around the propeller 9, the sound wave corresponding to the resonant frequency of the sound wave generated by the propeller 4 can be damped.

Figure 4:
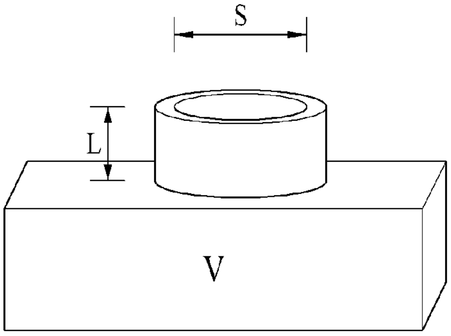
FIG. 4 is a view for explaining resonant frequency determination factors of resonant barrels.
Figure 5:
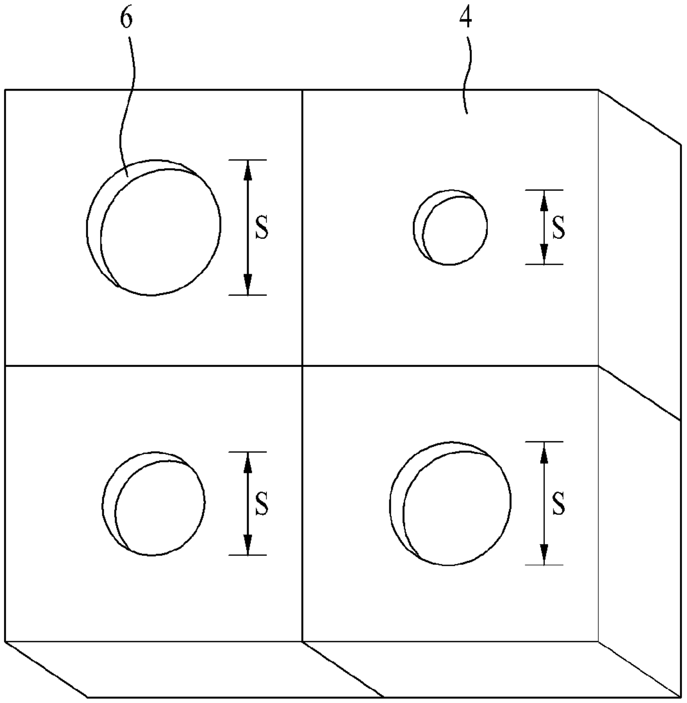
FIG. 5 is a perspective view illustrating a part of resonant barrels of the silencer duct depicted in FIGS. 1 to 3.

FIG. 4 is a view for explaining resonant frequency determination factors of the resonant barrels, and FIG. 5 is a perspective view illustrating a part of resonant barrels of the silencer duct depicted in FIGS. 1 to 3.

Referring to FIG. 4, the resonant frequency of each of the resonant barrels 4 is determined by an entrance area S of the resonant barrel 4, an entrance length L (length of neck or thickness), and an inner volume V of the resonant barrel 4. The frequency of the sound wave generated by the propeller 9 of the ship, to which the silencer duct 2 is installed, is first checked, and the resonant frequencies to be deadened can be calculated from the following formula 1.

$$f_0 = \frac{v}{2\pi}\sqrt{\frac{S}{L'V}} \qquad \text{Formula 1}$$

Herein, $f_0$ refers to a resonant frequency, v refers to the speed of sound in the fluid, about 1500 m/sec, S refers to an entrance area, V refers to an inner volume, and L' refers to an effective length of neck, a value obtained by adding a radius of the entrance to the length of neck.

In the case in which the entrance of the resonant barrel 4 is not formed in a circular shape, but in a polygonal shape such as a triangle, a quadrangle, etc., an effective radius r is calculated from formula 2.

$$r = \sqrt{\frac{S}{\pi}} \qquad \text{Formula 2}$$

As described above, the resonant barrels 4 corresponding to the sound frequencies to be deadened, i.e., the resonant frequencies, can be manufactured by using the above formula 1 and formula 2 as needed. Herein, the resonant barrels 4 deaden the sound wave of the specific frequency according to the following formula 3 as well as formula 1 and formula 2.

$$f_0 < f < f_d \qquad \text{Formula 3}$$

Herein, $f_0$ refers to the resonant frequency according to formula 1, and $f_d$ refers to a diffraction frequency. If resonance is generated, sound waves ranging from the frequency $f_0$ to a larger frequency are deadened. When the sound wavelength is larger than a diameter of an entrance of the silencer duct, soundproof effect according to diffraction occurs. The diffraction frequency $f_d$ corresponding to a diffraction wavelength can be determined by (speed of sound in water)/(inner diameter of the silencer duct).

As shown in FIG. 4, the plurality of resonant barrels 4 may be manufactured such that the entrance area S of each of the resonant barrels 4, which is one of the resonant frequency determination factors, is set to be the same as or different from that of other resonant barrels 4. In other words, in the case of deadening two or more sound frequencies, two or more kinds of resonant barrels 4 having different entrance areas S may be manufactured. If the entrance areas S of the resonant barrels 4 arranged in the form of n×m are formed to be respectively different corresponding to the sound frequencies to be deadened, sound waves of more various frequencies may be damped.

On the other hand, although not shown in the drawings, by forming not only the entrance area S of each of the resonant barrels 4 but also the inner volume V or the entrance length L to be the same as or different from that of other resonant barrels 4 according to the sound frequencies to be deadened, sound waves of various frequencies may be damped.

Figure 6:
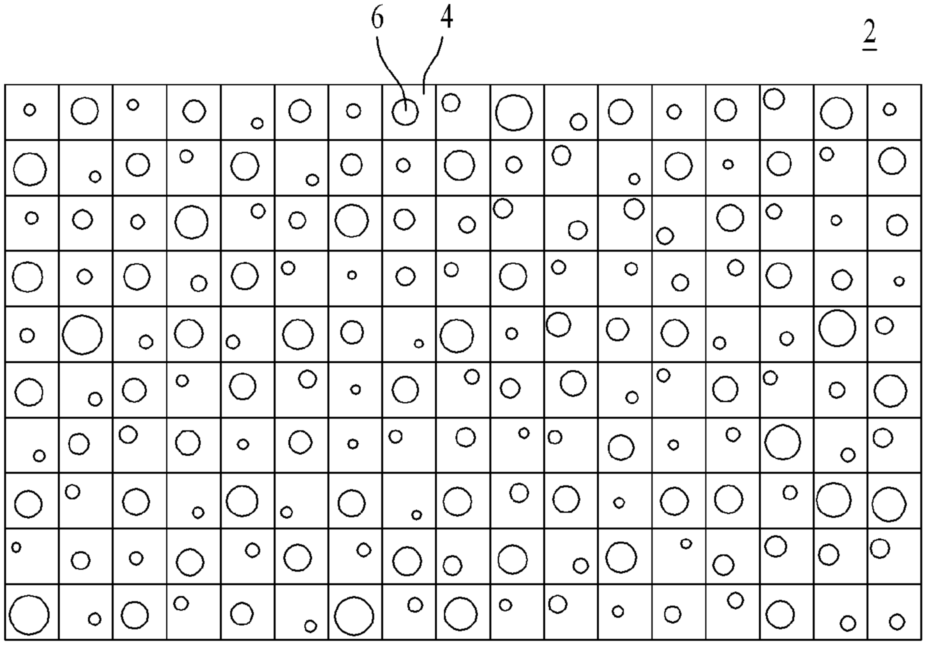
FIG. 6 is a view illustrating an inner surface of the cylindrical silencer duct depicted in FIGS. 1 to 3 in the form of a planar shape.

FIG. 6 is a view illustrating an inner surface of the cylindrical silencer duct depicted in FIGS. 1 to 3 in the form of a planar shape.

As shown in FIG. 6, the silencer duct 2 may be designed in such a manner that the entrance areas S of the resonant barrels 4 are formed to be different from each other according to the sound frequencies to be deadened and the resonant barrels 4 are arranged in the form of a planar shape. The longer silencer duct 2 may damp the wider sound frequency band. Especially, when the silencer duct 2 is longer than a diameter of the propeller 9, sound frequency damping effect is enhanced.

The resonant barrels 4 may be individually made of plastic, rubber, metal, etc. Such resonant barrels 4 may be adhered to a planar panel made of rubber, etc., and rolled into a cylindrical shape to form the cylindrical silencer duct 2.

Alternatively, the resonant barrels 4 may be made of flexible plastic, rubber, metal, etc., and formed integrally in a planar shape. In this case, the planar-shaped silencer duct 2 on which the resonant barrels 4 are integrally formed by an injection molding process is first formed, and the silencer duct 2 having the resonant barrels 4 arranged in the form of n×m is rolled into a cylindrical shape, thereby manufacturing the cylindrical silencer duct 2.

As described above, the silencer duct 2 is secured to an outer wall surface of a ship so that the propeller 9 is positioned inside the silencer duct 2. At this time, if the propeller 9 is positioned at an inner front portion of the silencer duct 2, soundproof effect is enhanced, and if the propeller 9 is positioned closer to an inner middle portion of the silencer duct 2, pressure duct effect is enhanced. Therefore, it is preferable to mount the propeller 9 at a proper position according to a size, structure or usage purpose of a ship.

The preferred embodiments described in the specification and shown in the drawings are illustrative only and are not intended to represent all aspects of the invention, and it will be apparent to those skilled in the art that various modifications, equivalents and alternatives can be made in the present invention without departing from the spirit or scope of the invention.

The invention claimed is:

1. A silencer duct for a ship's propeller using resonant barrels, wherein the silencer duct is formed in a cylindrical shape to surround a propeller mounted to a side portion or a tail of a ship, thereby guiding a fluid direction as the propeller rotates, and includes a plurality of resonant barrels for damping resonant frequencies, the resonant barrels being formed on an inner surface of the silencer duct and arranged in the form of n×m (herein, n and m are non-zero natural numbers) so as to damp sound waves generated by rotation of the propeller, wherein the resonant frequencies can be calculated from the following formula 1, $$f_0 = \frac{v}{2\pi}\sqrt{\frac{S}{L'V}} \qquad \text{Formula 1}$$

wherein, $f_0$ refers to a resonant frequency, v refers to the speed of sound in the fluid, S refers to an entrance area of each of the resonant barrels, V refers to an inner volume of each of the resonant barrels, and L' refers to an effective length of neck of each of the resonant barrels.

2. The silencer duct for a ship's propeller using resonant barrels according to claim 1, wherein the resonant barrels arranged in the form of n×m are arranged on the inner surface of the silencer duct in a cylindrical shape such that entrances thereof are directed toward a center of the silencer duct, and a hub of the propeller is positioned at the center of the cylindrical silencer duct, so that the resonant barrels are arranged to surround pre-swirl stators of the propeller in a cylindrical shape.

3. The silencer duct for a ship's propeller using resonant barrels according to claim 2, wherein the resonant barrels are formed such that the entrance area of each of the resonant barrels is set to be the same as or different from that of other resonant barrels according to sound frequencies to be deadened, thereby damping sound waves of the same or different resonant frequencies.

4. The silencer duct for a ship's propeller using resonant barrels according to claim 3, wherein the resonant barrels are formed such that not only the entrance area but also the inner volume or effective length of neck of each of the resonant barrels is set to be the same as or different from that of other resonant barrels according to sound frequencies to be deadened, thereby damping sound waves of the same or different resonant frequencies.

5. The silencer duct for a ship's propeller using resonant barrels according to claim 4, wherein the resonant barrels are individually made of plastic, rubber or metal, and are adhered to a planar panel made of rubber and rolled into a cylindrical shape.

6. The silencer duct for a ship's propeller using resonant barrels according to claim 4, wherein the resonant barrels are made by injection molding from flexible plastic, rubber or metal to be formed integrally in a planar shape, and are rolled into a cylindrical shape.

7. The silencer duct for a ship's propeller using resonant barrels according to claim 4, wherein the propeller is positioned at an inner front portion of the cylindrical silencer duct, an inner middle portion of the cylindrical silencer duct, or between the inner front portion and the inner middle portion of the cylindrical silencer duct.

* * * * *